(12) United States Patent
Takeuchi

(10) Patent No.: US 7,368,850 B2
(45) Date of Patent: May 6, 2008

(54) RESONANCE CONTROL APPARATUS FOR A PIEZOELECTRICAL DEVICE BASED ON PHASE SENSITIVE DETECTION

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 341 days.

(21) Appl. No.: 10/535,595

(22) PCT Filed: Dec. 25, 2003

(86) PCT No.: PCT/JP03/16822

§ 371 (c)(1),
(2), (4) Date: May 19, 2005

(87) PCT Pub. No.: WO2004/064171

PCT Pub. Date: Jul. 29, 2004

(65) Prior Publication Data

US 2006/0071723 A1    Apr. 6, 2006

(30) Foreign Application Priority Data

Jan. 10, 2003    (JP) .............................. 2003-005037

(51) Int. Cl.
*H01L 41/08* (2006.01)
(52) U.S. Cl. ..................................... 310/317
(58) Field of Classification Search ........... 310/316.01, 310/316.02
See application file for complete search history.

(56) References Cited

U.S. PATENT DOCUMENTS 4,965,532 A    10/1990    Sakurai 5,563,478 A    10/1996    Suganuma
5,767,609 A    6/1998    Suganuma
6,339,368 B1    1/2002    Leith

FOREIGN PATENT DOCUMENTS

| JP | 03-243183 | 10/1991 |
|---|---|---|
| JP | 03-289375 | 12/1991 |
| JP | 2000-175069 | 6/2000 |

*Primary Examiner*—Mark Budd
(74) *Attorney, Agent, or Firm*—Harness, Dickey & Pierce, P.L.C.

(57) ABSTRACT

A resonance control apparatus 100 includes a VCO 10 which generates a reference signal having a predetermined frequency, a divider 20 which divides the predetermined frequency of the reference signal, a phase reference forming section 50 which delays a phase of the divided signal for a predetermined interval, a voltage comparator 40 which compares a voltage of the output signal from a piezoelectric sensor 2 for detecting the driving state of a piezoelectric load 3 in synchronization with the driving of the piezoelectric load 3 with a predetermined voltage, a phase comparator 60 which compares the phase of the output signal from the voltage comparator 40 with the phase of the output signal from the phase reference forming section 50, and a duty control section 30 for controlling a duty ratio of the drive signal supplied to the piezoelectric load 3 based on the reference signal.

13 Claims, 11 Drawing Sheets

(A)
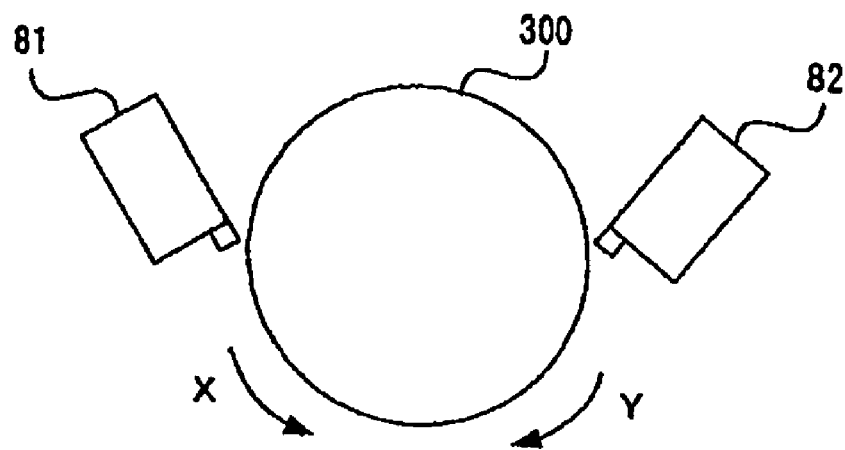
(B)
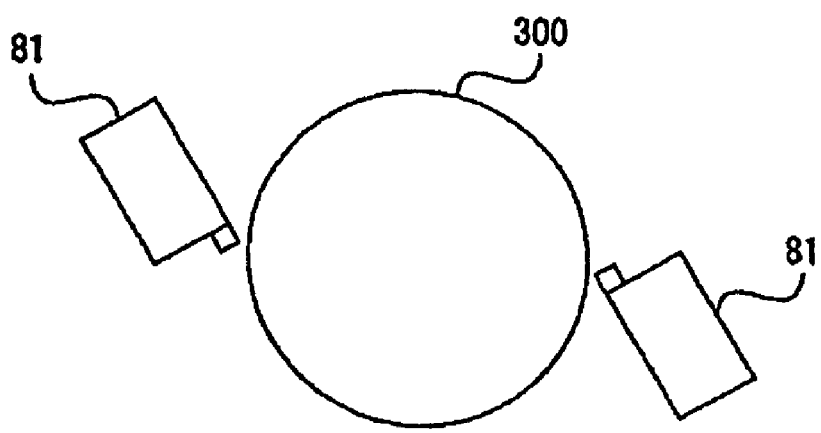
Fig. 8

RESONANCE CONTROL APPARATUS FOR A PIEZOELECTRICAL DEVICE BASED ON PHASE SENSITIVE DETECTION

TECHNICAL FIELD

The present invention relates to a resonance control apparatus and a method of controlling the same.

BACKGROUND ART

In a resonance control apparatus such as a driving device using a piezoelectric effect of a piezoelectric element (as a ultrasonic motor, including ones disclosed in Japanese Laid-Open Patent Application No. HEI. 3-243183 and Japanese Laid-Open Patent Application No. HEI. 3-289375, for example), and a display device using a piezoelectric effect, a resonant point of a resonant frequency at which the drive efficiency is maximized may undergo a change due to the piezoelectric characteristic, temperature characteristic, structural characteristic of the peripheral mechanics or the like.

Therefore, in a conventional resonance control apparatus, the driving state of the load is detected as a potential (voltage value) using a piezoelectric sensor, the detected voltage value of the output signal from the piezoelectric sensor is integral-operated using a CPU (processor), a driving frequency of the load is heightened and/or lowered until the operated result (integrated value of the potential) leads to the substantially maximum value, and the frequency when the operated result becomes maximum is utilized as a resonant frequency.

Here, the structure of a conventional resonance control apparatus will be described with reference to FIG. 11. FIG. 11 is a block diagram schematically illustrating a main portion of the conventional resonance control apparatus 200. As shown in FIG. 11, the conventional resonance control apparatus 200 includes a central processing unit (CPU) 1, an amplifier section 4, a gain control amplifier section 5, a voltage controlled oscillator (VCO) 10, an analog-digital converter (ADC) 6, and two digital-analog converters (DAC) 7, 8. Further, the conventional resonance control apparatus 200 is connected to a piezoelectric sensor 2 and a piezoelectric element (piezoelectric load) 3 via the amplifier section 4 and the gain control amplifier section 5, respectively.

As described above, the voltage value (potential data) of the driving state of the piezoelectric load 3, which is outputted from the piezoelectric sensor 2, is amplified by the amplifier section 4, and converted into a digital data by the ADC 6 to input into the CPU 1. The CPU 1 carries out an integral operation of the voltage value inputted from the ADC 6, and heightens the frequency of a drive signal for the piezoelectric load 3 until the voltage value reaches a resonant frequency region of the piezoelectric sensor 2 (see FIG. 3). During the rising of the frequency of the drive signal, the CPU 1 outputs instantaneous voltage value data to the VCO 10 via the DAC 7, and then the VCO 10 generates the drive signal for the piezoelectric load 3 having a predetermined frequency in response to the inputted voltage value data to output the drive signal to the gain control amplifier section 5.

The gain control amplifier section 5 adjusts the gain of the drive signal generated in the VCO 10 based on a delay control signal that is inputted from the CPU 1 via the DAC 8, delays the phase of the drive signal so that the phase of the drive signal synchronizes with the phase of detected signal outputted from the piezoelectric sensor 2 (this process corresponds to delay process), and outputs the drive signal whose phase was delayed by the gain control amplifier section 5 to the piezoelectric load 3.

Subsequently, when the CPU 1 judges that the integral-operated value of the voltage value at a given frequency substantially reaches a maximum value by heightening and/or lowering the frequency of the drive signal, the CPU 1 determines that the given frequency is a resonant point of the piezoelectric load 3, i.e., the frequency of the drive signal reaches the resonant frequency of the piezoelectric load 3 (this process corresponds to frequency determination process), and outputs the voltage value at the resonant point to the VCO 10 via the DAC 7. The VCO 10 outputs the drive signal having the frequency corresponding to the voltage value (i.e., resonant frequency) to the gain control amplifier section 5. After gain control process and phase delay process are carried out in the gain control amplifier section 5, the piezoelectric load 3 is driven by the resulting drive signal. In this way, the conventional resonance control apparatus 200 controls the driving of the piezoelectric load 3 with the drive signal having the resonant frequency after the resonant frequency is obtained.

However, in the conventional resonance control apparatus 200, in the case where a rapid drive control such as posture control is implemented, it takes quite a long time to obtain the resonant frequency of the piezoelectric load 3 by gradually heightening the frequency of the drive signal as described above because the CPU 1 carries out the above-mentioned operated process. Therefore, there is a problem that unstable state of control, namely, the state in which the CPU 1 is carrying out the operated process is frequently taken place.

Further, since the conventional resonance control apparatus 200 includes analog peripheral circuits such as the ADC 6, the DACs 7, 8, and the like, there is a problem that it is difficult to integrate these circuits into an IC chip for digital operation.

Moreover, since the conventional resonance control apparatus 200 includes the CPU 1 for carrying out the operated process, the system including the CPU 1 becomes a big deal. Therefore, there is a problem that it is difficult to make a circuit dimension (circuitry) small (to downsize the circuit dimension).

DISCLOSURE OF INVENTION

In view of the above-mentioned problems of the prior art, it is therefore an object of the present invention to provide a resonance control apparatus and a method of controlling a resonant device which can control the rest or movement of an object in the posture control quickly because it takes quite a short time to obtain a resonant frequency of the resonant device, and can downsize the circuitry of the resonance control apparatus because it is easy to integrate the control sections thereof into an IC chip.

In order to achieve the above object, in one aspect of the present invention, the present invention is directed to a resonance control apparatus for driving a resonant device having a resonance characteristic. The resonant device functions as a resonant sensor. The resonance control apparatus comprises:

a reference signal generating section for generating a reference signal having a predetermined frequency in response to a voltage signal that is inputted into the reference signal generating section;

a divider which divides the predetermined frequency of the reference signal generated by the reference signal generating section to output a signal having a given frequency;

a phase reference forming section which delays a phase of the signal outputted from the divider for a predetermined interval;

a voltage comparator for comparing a voltage of the output signal from the resonant sensor with a predetermined voltage, the resonant sensor detecting the driving state of the resonant device in synchronization with the driving of the resonant device;

a phase comparator for comparing the phase of the signal outputted from the voltage comparator with the phase of the signal outputted from the phase reference forming section; and a duty control section for controlling a duty ratio of the drive signal provided for the resonant device based on the reference signal outputted from the reference signal generating section.

In the resonance control apparatus of the present invention, the resonant device is driven by self-controlling the frequency of the drive signal for the resonant device using the output signal from the resonant sensor as a feedback value. Therefore, according to the resonance control apparatus of the present invention, it is possible to shorten (reduce) the time required to obtain the resonant frequency of the resonant device, thereby being capable of controlling the rest or movement of an object in the posture control quickly (i.e., capable of controlling a duty ratio of the drive signal). Further, it is possible to integrate the control sections of the resonance control apparatus into an IC chip, thereby being capable of downsizing the circuitry of the resonance control apparatus.

In this case, it is preferred that the resonance control apparatus further comprises a low-pass filter which cuts out a high frequency component of the output signal from the phase comparator wherein the output signal from the low-pass filter constitutes the voltage signal inputted into the reference signal generating section.

Further, it is preferred that the phase reference forming section is constructed so as to be capable of selecting either a rising edge or trailing edge of the signal delayed in the phase reference forming section when the phase comparator compares the phases, based on the duty ratio of the drive signal controlled by the duty control section.

Moreover, it is preferred that the duty control section drives the resonant device with the duty ratio in the range of either 10%-50% or 50%-90%.

Further, it is preferred that the output signal from the resonant device corresponds to a resonant frequency of the resonant device, and the frequency of the drive signal outputted from the duty control section is controlled so as to be equal to the resonant frequency.

In this case, it is preferred that the resonance control apparatus carries out the PWM control for the resonant device based on the duty ratio of the drive signal controlled by the duty control section.

Further, in this case, it is preferred that the PWM control is carried out so as to maintain the resonant frequency of the resonant device.

Further, it is preferred that the resonance control apparatus further comprises a first phase correction section arranged between the voltage comparator and the phase comparator, the first phase correction section correcting the phase of the signal outputted from the voltage comparator to output the phase-corrected signal to the phase comparator.

In this case, it is also preferred that the resonance control apparatus further comprises a second phase correction section for correcting the phase of the output signal from the duty control section in response to the phase of the resonant frequency of the resonant device.

In another embodiment of the present invention, it is preferred that the resonance control apparatus further comprises a second duty control section having a function same as the duty control section, the second duty control section being arranged in parallel with the duty control section;

wherein the two duty control sections are respectively provided for normal drive and reverse drive of the resonant devices, and can control the duty ratios of the drive signals for normal drive and reverse drive either independently or jointly.

Alternatively, it is preferred that the resonance control apparatus further comprises at least one duty control section having a function same as the duty control section arranged in parallel with the duty control section;

wherein at least two duty control sections among the duty control section and the at least one duty control section are provided for normal drive of the resonant devices, and can control the duty ratio of the drive signals for normal drive either independently or jointly.

The present invention is directed to a resonance control apparatus for driving a resonant device having a resonance characteristic. The resonant device functions as a resonant sensor. The resonance control apparatus compares the phase of a drive signal for the resonant device with the phase of an output signal from the resonant sensor, which is utilized as a feedback value for the resonant device, and outputs the drive signal to the resonant device in response to the difference between the phases.

Further, in another aspect of the present invention, the present invention is directed to a method of controlling a resonant device having a resonance characteristic. The resonant device functions as a resonant sensor. The method comprises the steps of:

generating a reference signal having a predetermined frequency in response to a voltage signal to be inputted, the reference signal being a drive signal for the resonant device;

dividing the predetermined frequency of the reference signal to output a signal having a given frequency;

delaying a phase of the output signal for a predetermined interval;

comparing a voltage of the output signal from a resonant sensor with a predetermined voltage to output a voltage comparison signal, the resonant sensor detecting the driving state of the resonant device in synchronization with the driving of the resonant device; and comparing the phase of the voltage comparison signal with the phase of the delayed signal to output a phase comparison signal, the phase comparison signal corresponding to the voltage signal to be inputted.

In the present invention, it is preferred that the method further comprises the steps of:

controlling a duty ratio of the drive signal supplied to the resonant device; and carrying out the PWM control for the resonant device using the duty ratio of the drive signal.

In this case, it is preferred that the duty ratio controlling step includes respectively controlling duty ratios of two types of drive signals supplied to two resonant devices, which are provided for normal drive and reverse drive of the two resonant devices, based on the reference signal, and the PWM control carrying out step includes carrying out the PWM control for the two resonant devices using the duty ratios of the drive signals.

Alternatively, it is preferred that the duty ratio controlling step includes respectively controlling duty ratios of at least two drive signals for normal drive supplied to at least two resonant devices based on the reference signal either independently or jointly, and the PWM control carrying out step includes carrying out the PWM control for the at least two resonant devices using the duty ratios of the at least two drive signals.

BRIEF DESCRIPTION OF DRAWINGS

The foregoing and other objects, features and advantages of the invention will become more readily apparent from the following detailed description of preferred embodiments of the invention which proceeds with reference to the accompanying drawings.

FIGS. 8(A) and 8(B) are diagrams illustrating the structures in which two vibrating elements each including a piezoelectric element that is controlled by the resonance control apparatus according to the present invention rotate a rotor.

BEST MODE FOR CARRYING OUT THE INVENTION

A detailed description of the preferred embodiments of a resonance control apparatus and a method of controlling a resonant device according to the present invention will now be made with reference to FIGS. 1-10. Now, it should be noted that the embodiments (disclosure) are to be considered as an exemplification, and therefore this feature should not be intended to limit the present invention to the specific embodiments illustrated.

Figure 1:
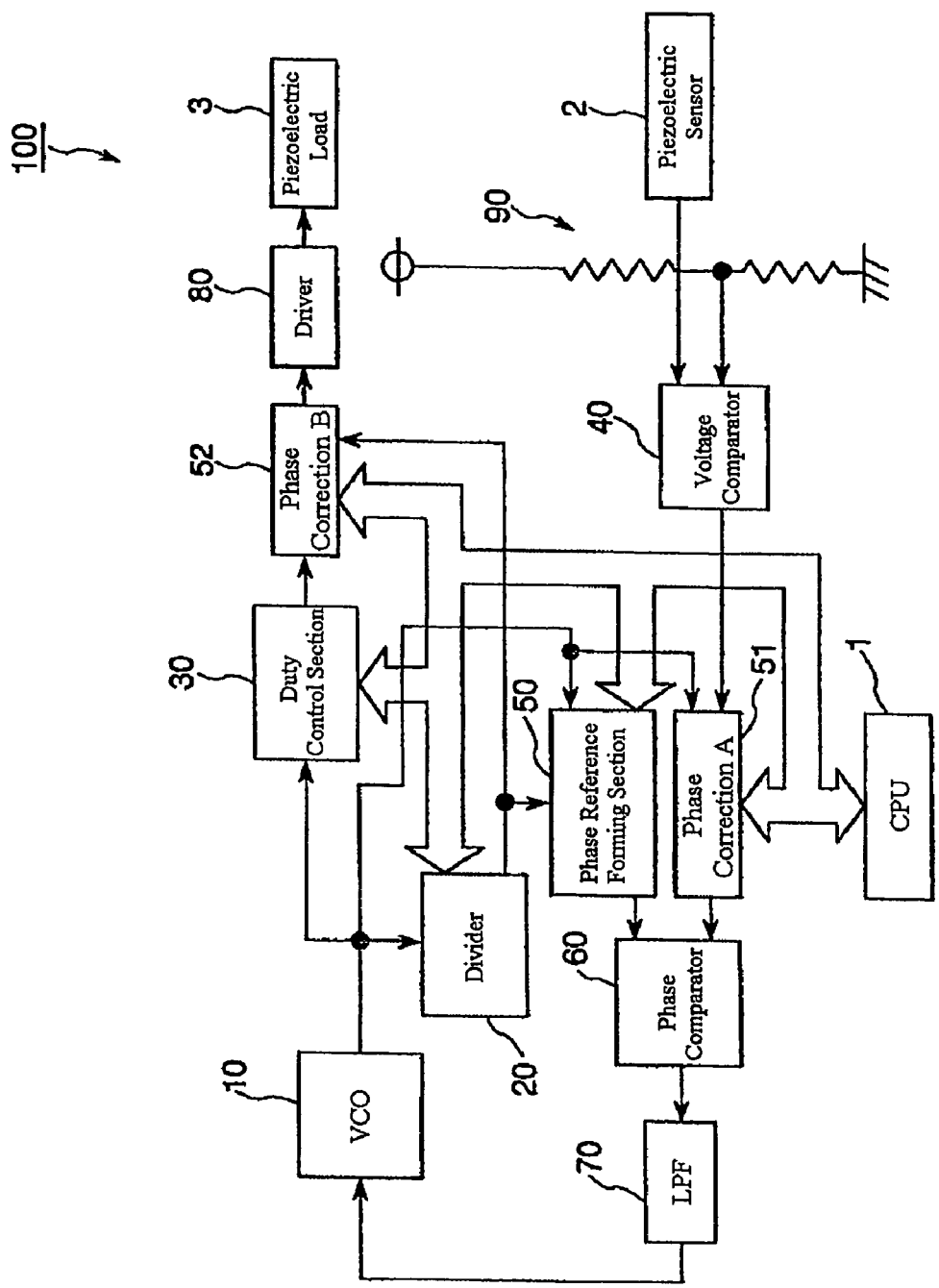
FIG. 1 is a schematic block diagram illustrating a main portion (circuit diagram) of a resonance control apparatus according to the present invention.

First, a description will be given for the structure of the resonance control apparatus 100 of the present invention. FIG. 1 is a schematic block diagram illustrating a main portion (circuit diagram) of the resonance control apparatus 100 according to the present invention. As shown in FIG. 1, the resonance control apparatus 100 includes a voltage controlled oscillator (VCO) 10, a divider 20, a duty control section 30, a voltage comparator 40, a phase reference forming section 50, a first phase correction section (phase correction A) 51, a second phase correction section (phase correction B) 52, a phase comparator 60, a low-pass filter (LPF) 70, a driver 80, and a reference voltage setting section 90 for setting a voltage value that is a reference voltage for the voltage comparator 40. In this regard, a piezoelectric load (resonant device) 3 whose drive is controlled by means of the resonance control apparatus 100 is connected to the driver 80, and a piezoelectric sensor (resonant sensor) 2 for detecting the driving state of the piezoelectric load 3 in synchronization with the driving of the piezoelectric load 3 is connected to one input terminal of the voltage comparator 40. A detailed description of each component is given below. In this case, as shown in FIG. 1, a central processing unit (CPU) 1 controls the divider 20, the duty control section 30, the phase reference forming section 50, the first phase correction section 51, and the second phase correction section 52.

The VCO 10 generates a reference signal having a predetermined frequency based on the output signal (voltage signal) from the phase comparator 60 described later whose high frequency component is cut out by the LPF 70, and outputs the reference signal. The output signal from the VCO 10 is inputted to the divider 20, the duty control section 30, the phase reference forming section 50, and the first phase correction section 51.

The divider 20 divides the frequency of the reference signal that is the output signal from the VCO 10 by a predetermined value. The output signal from the divider 20 whose frequency is divided is inputted to the phase reference forming section 50, and the second phase correction section 52. In this regard, the dividing ratio of the divider 20 is controlled by the CPU 1.

The duty control section 30 controls a duty ratio of a drive signal for the piezoelectric load 3 by control of the CPU 1. The output signal from the duty control section 30 is inputted to the second phase correction section 52. The second phase correction section 52 controls the setting of the duty ratio of the output signal from the divider 20 based on a control signal inputted from the duty control section 30 to output the signal (this is the drive signal) to the driver 80. Then, the driver 80 inputs the drive signal to the piezoelectric load 3 to control the driving of the piezoelectric load 3. In this regard, the relationship between the duty ratio and drive vector ratio of the piezoelectric load (piezoelectric element) 3 will be described later (see FIG. 4).

The piezoelectric sensor 2 detects the driving state of the piezoelectric load 3 in synchronization with the driving of the piezoelectric load 3. The detected signal (voltage signal) that is the output signal from the piezoelectric sensor 2 is inputted to one input terminal of the voltage comparator 40. Further, a voltage signal that is the reference for voltage comparison in the voltage comparator 40 is set by the reference voltage setting section 90 to input the reference voltage to the other input terminal of the voltage comparator 40. In this case, in the present embodiment, the reference voltage setting section 90 is consisted of two resistors or variable resistors and a constant voltage source. The voltage value of the reference voltage signal may be set manually in the case where the reference voltage setting section 90 includes one or two variable resistor(s). However, the present invention is not limited to this structure. For example, the voltage value may be controllable by the CPU 1. The voltage value of the reference voltage signal (this is a predetermined voltage value, i.e., threshold for the voltage comparison) is previously set based on the resonant frequency characteristic of the piezoelectric load 3 to be utilized. The detailed description thereof will be described later.

The voltage comparator 40 compares the output signal from the piezoelectric sensor 2 (i.e., detected signal) with the reference voltage signal. Then, in the case where the voltage value of the output signal from the piezoelectric sensor 2 is larger than the voltage value of the reference voltage signal, the voltage comparator 40 outputs a high-level signal to the first phase correction section 51. On the other hand, in the case where the voltage value of the output signal is smaller than the voltage value of the reference voltage signal, the voltage comparator 40 outputs a low-level signal to the first phase correction section 51. Namely, the voltage comparator 40 digitizes the output signal from the piezoelectric sensor 2 to output the digitized signal (i.e., high-level or low-level signal) to the first phase correction section 51.

The phase reference forming section 50 delays the phase of the output signal from the divider 20 for a predetermined interval (time), and selects either a rising edge or a trailing edge of the delayed signal based on the duty ratio of the drive signal controlled by the CPU 1 and the duty control section 30. The delayed signal outputted from the phase reference forming section 50 is inputted to one input terminal of the phase comparator 60. In this regard, the operation of the phase reference forming section 50 will be described later.

The first phase correction section 51 delays the phase of the voltage comparison signal inputted from the voltage comparator 40 by control of the CPU 1. The delayed signal outputted from the first phase correction section 51 is inputted to the other input terminal of the phase comparator 60. In this way, since the resonance control apparatus 100 can delay the phase of each of the signals inputted to the phase comparator 60 via the two input terminals thereof by means of the phase reference forming section 50 and the first phase correction section 51, the signal inputted from the phase reference forming section 50 can be also adjusted so that the inputted signal is apparently led.

Figure 2:
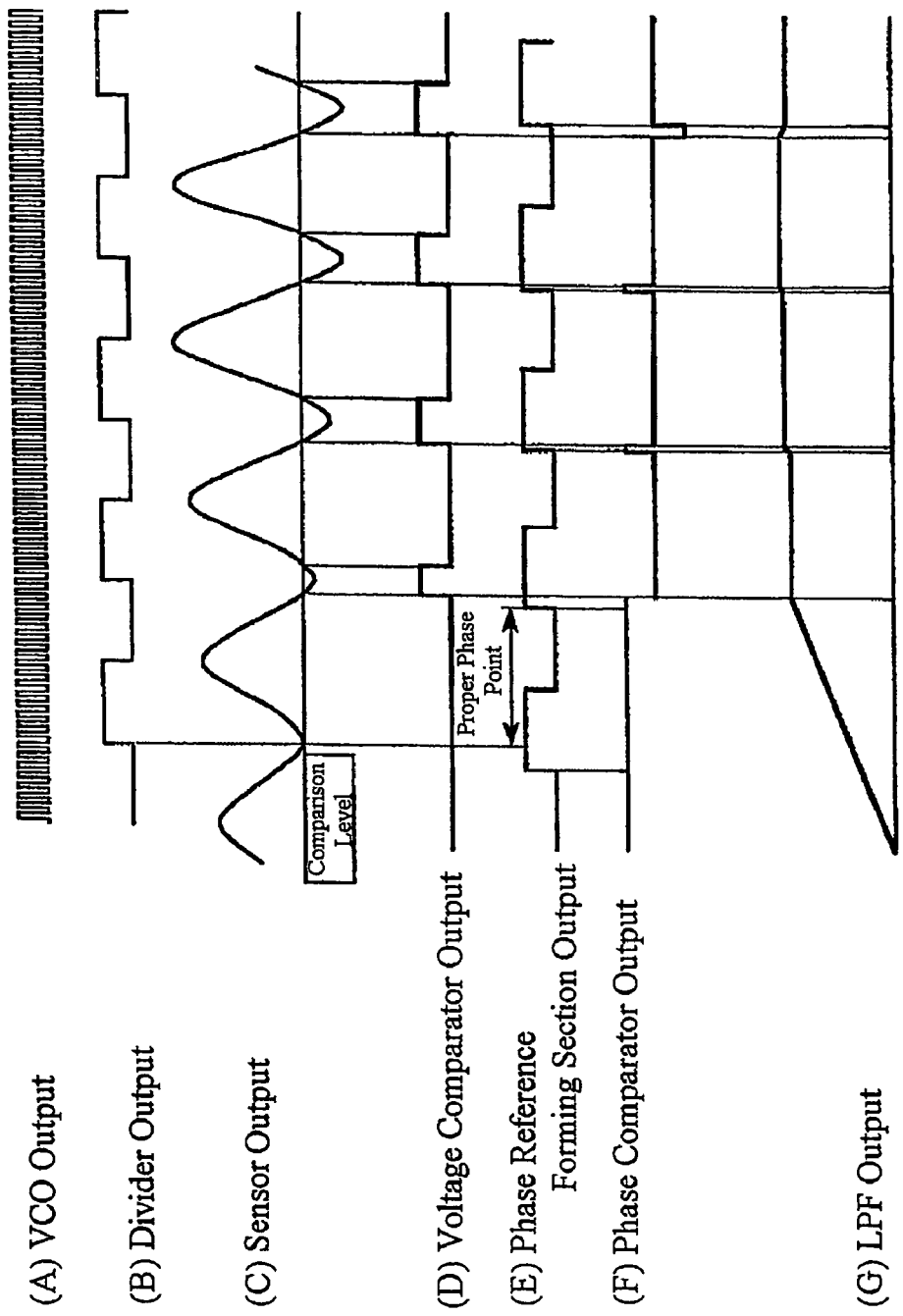
FIG. 2 shows timing charts illustrating output waveforms of components in the resonance control apparatus shown in FIG. 1.

The phase comparator 60 compares the phase of the signal inputted from the first phase correction section 51 with the phase of the signal inputted from the phase reference forming section 50. Then, as shown in FIG. 2 described later, the phase comparator 60 outputs a high-level signal to the LPF 70 in the case where the phase point of the output signal from the first phase correction section 51 (i.e., the point of the rising edge on the time axis) is earlier than the phase point of the output signal from the phase reference forming section 50 (i.e., proper phase point). On the other hand, the phase comparator 60 outputs a low-level signal to the LPF 70 in the case where the phase point of the first phase correction section 51 is later than the phase point of the phase reference forming section 50. In this regard, in the case where both the two signals inputted to the phase comparator 60 are in high level (i.e., Hi-Z), the phase comparator 60 outputs the signal corresponding to zero level. Namely, the phase comparator 60 outputs a ternary (three-valued) signal to the LPF 70 in response to the two signals inputted from the phase reference forming section 50 and the first phase correction section 51.

The LPF 70 cuts out a high frequency component of the phase comparison signal (three-valued signal) inputted from the phase comparator 60 to output the voltage signal whose high frequency component is cut out to the VCO 10. In this way, the resonance control apparatus 100 controls the frequency of the drive signal (i.e., the resonant frequency) by feeding back the driving state of the piezoelectric load 3 that is detected by the piezoelectric sensor 2 to the VCO 10 that is the reference signal generating section.

Here, by the thought that the output signal from the voltage comparator 40 is a reference signal outputted from a base oscillator (base frequency generating section), the VCO (reference signal generating section) 10, the divider 20, the voltage comparator 40, the phase comparator 60, and the LPF 70 constitute a sort of PLL circuit (In a general PLL circuit, the frequency of a reference signal generated by and outputted from a base oscillator (base frequency generating section) is not changeable (i.e., does not undergo a change), but in this circuit (the sort of PLL circuit), the frequency of a reference signal is changeable because a detected signal outputted from the piezoelectric sensor 2 is utilized as the reference signal. In this point, this circuit differs from the general PLL circuit.). In this way, since the resonance control apparatus 100 is constructed to include the sort of PLL circuit (the circuit having a function similar to that of the general PLL circuit) therein, the resonance control apparatus 100 can generate a reference signal having the phase-locked frequency N times as the frequency of the drive signal for the piezoelectric load 3 (i.e., the drive frequency) (where "N" is a value arbitrarily set by the CPU 1).

Next, a description will be given for the operation of the resonance control apparatus 100 of the present invention with reference to timing charts shown in FIG. 2. FIG. 2 shows timing charts illustrating output waveforms of the components in the resonance control apparatus 100 shown in FIG. 1. In these timing charts, FIG. 2(A) shows a waveform of the output signal from the VCO 10 which is a reference signal, FIG. 2(B) shows a waveform of the output signal from the divider 20 which is obtained by dividing the reference signal by means of the divider 20, FIG. 2(C) shows a waveform of the output signal from the piezoelectric sensor 2, FIG. 2(D) shows a waveform of the output signal from the voltage comparator 40, FIG. 2(E) shows a waveform of the output signal from the phase reference forming section 50, FIG. 2(F) shows a waveform of the output signal from the phase comparator 60, and FIG. 2(G) shows a waveform of the output signal from the LPF 70. As shown in FIGS. 2(B) and 2(D), the rising point (rising timing) of the output signal from the divider 20 is delayed to a proper phase point by means of the phase reference forming section 50.

As shown in FIG. 2(C), the amplitude of the waveform in the output signal from the piezoelectric sensor 2 (sensor output waveform) is gradually enlarged in accordance with an increase of the frequency of the drive signal for the piezoelectric load 3. A predetermined threshold (voltage comparison level) shown in FIG. 2(C) is a voltage value set by the reference voltage setting section 90 by inputting the voltage value to the one input terminal of the voltage comparator 40. As shown in FIG. 2(D), when the waveform of the output signal from the piezoelectric sensor 2 becomes larger than the predetermined threshold, the voltage comparator 40 outputs a high-level signal.

The phase comparator 60 compares the phase of the output signal from the voltage comparator 40 shown in FIG. 2(D) with the phase (phase reference) of the output signal from the phase reference forming section 50 shown in FIG. 2(E). In this case, the timing charts show a case where the phase of the output signal from the voltage comparator 40 is not delayed by the first phase correction section 51. As shown in FIG. 2(F), the phase comparator 60 outputs a high-level signal in the case where the rising point of the output signal from the phase reference forming section 50 is earlier than the rising point of the output signal from the voltage comparator 40. On the other hand, the phase comparator 60 outputs a low-level signal in the case where the rising point of the output signal from the phase reference forming section 50 is later than the rising point of the output signal from the voltage comparator 40.

A detailed description will be given for the operation for the phase comparator 60 shown in FIG. 2(F) using FIGS. 2(D) and 2(E). In the case where the waveform of the output signal from the piezoelectric sensor 2 is not matched with the voltage comparison level of the voltage comparator 40, i.e., in the case where the amplitude of the output signal from the piezoelectric sensor 2 is smaller than the reference voltage (voltage comparison level) set by the reference voltage setting section 90, the phase comparator 60 outputs the high-level signal in regardless of the waveform of the output signal from the phase reference forming section 50. First, when the output signal from the voltage comparator 40 becomes the high level, the output signal from the phase comparator 60 becomes zero (i.e., Hi-Z) in response to the change. Then, when the output signal from the phase reference forming section 50 rises up, the output signal from the phase comparator 60 becomes a high level. When the output signal from the voltage comparator 40 rises up after that time, the output signal from the phase comparator 60 becomes a zero level. As seen from FIG. 2(F), this state (generation of a pulse) occurs twice in this embodiment. Next, when the output signal from the voltage comparator 40 rises up earlier than the rising of the output signal from the phase reference forming section 50, the output signal from the phase comparator 60 becomes a low level. Then, when the output signal from the phase reference forming section 50 rises up, the output signal from the phase comparator 60 becomes the zero level again. After that, same operation is repeated. In this regard, since the case where the duty ratio is more than 50% is shown in the timing charts, the phase comparator 60 compares the phases using the rising point of the output signal from the phase reference forming section 50 (see FIG. 5).

As shown in FIG. 2(G), the waveform of the output signal from the LPF 70 responds to the waveform of the output signal from the phase comparator 60. The output signal from the LPF 70 is raised up while the output signal from the phase comparator 60 is in the high level, kept at a constant level while the output signal from the phase comparator 60 is in the zero level, and dropped down while the output signal from the phase comparator 60 is in the low level. Thus, in the case where the rising point (rising timing) of the output signal from the voltage comparator 40 is later than the rising point (rising timing) of the output signal from the phase reference forming section 50, the voltage value of the output signal from the LPF 70 rises up in order to heighten the frequency of the output signal from the VCO 10. On the other hand, in the case where the rising point (rising timing) of the output signal from the voltage comparator 40 is earlier than the rising point (rising timing) of the output signal from the phase reference forming section 50, the voltage value of the output signal from the LPF 70 drops down in order to lower the frequency of the output signal from the VCO 10.

In this way, in the resonance control apparatus 100 of the present invention, since the frequency of the drive signal of the piezoelectric load 3 is self-corrected based on the detected signal inputted from the piezoelectric sensor 2 which detects the driving state of the piezoelectric load 3 that is driving in response to the drive signal, it is possible to shorten (reduce) the time required to obtain the resonant frequency of the piezoelectric load 3 in comparison with the conventional resonance control apparatus using a CPU to obtain the resonant frequency. Therefore, according to the resonance control apparatus 100, it is possible to appropriately deal with posture control and the like in which a drive frequency of a piezoelectric load may be changed rapidly.

Figure 3:
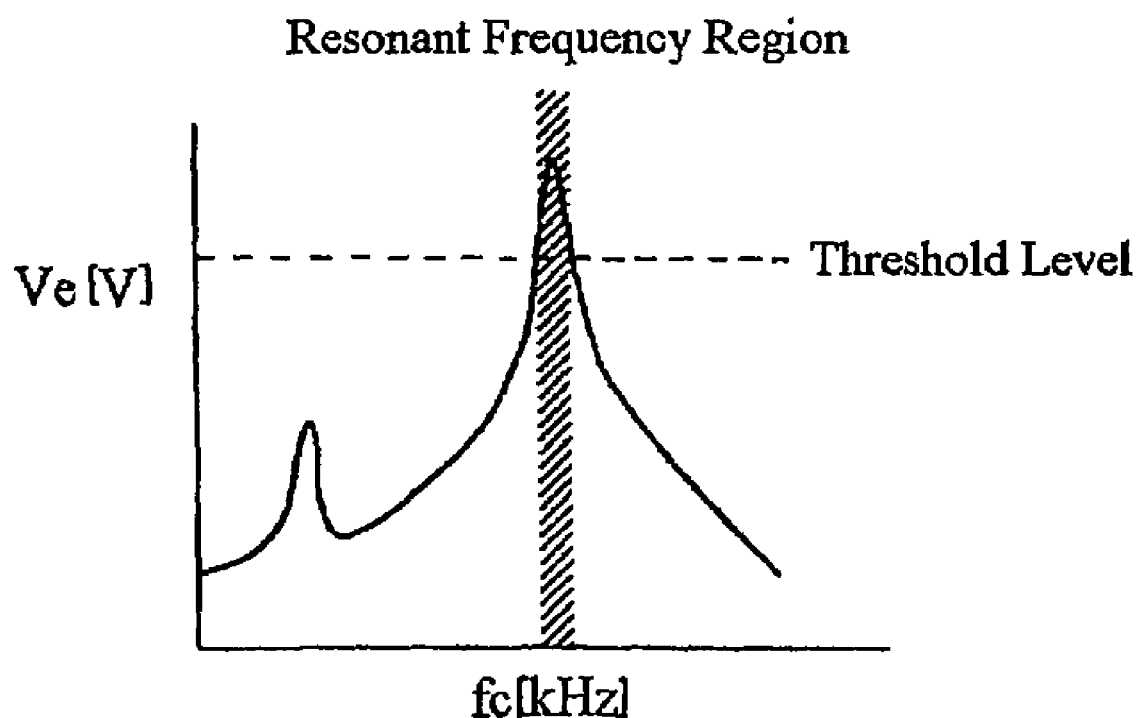
FIG. 3 is a graph illustrating a resonant frequency characteristic of a piezoelectric load.

Next, a description will be given for a resonant frequency characteristic in case of using a piezoelectric load with a piezoelectric effect. FIG. 3 is a graph illustrating a resonant frequency characteristic of a piezoelectric load. It is well known that the piezoelectric load 3 has a resonant frequency characteristic shown in FIG. 3. The peak point (shown with diagonal lines) indicates a resonant frequency region (the piezoelectric load 3 has a resonant point corresponding to the resonant frequency fc). The resonant point depends on physical conditions such as a shape of a rotor, a wearing state of the rotor, humidity, load characteristic, or the like in the driving device with the piezoelectric element whose resonant frequency constantly undergoes a change. In this way, the maximum energy can be obtained from the piezoelectric load 3 at the resonant frequency (resonant point), but it takes a long time until the conventional resonance control apparatus obtains the resonant point by gradually heightening the drive frequency. Therefore, the resonance control apparatus 100 is constructed so as to take no account of (i.e., skip) the frequency range lower than the resonant frequency region shown in FIG. 3 by comparing the voltage value of the output signal from the piezoelectric sensor 2 with the predetermined voltage value by means of the voltage comparator 40, to restore the frequency to the resonant point by comparing the phases in the range in which the output signal from the piezoelectric sensor 2 exceeds the threshold set in the voltage comparator 40, and to obtain the resonant frequency (resonant point). Thus, according to the resonance control apparatus 100 of the present invention, it is possible to shorten (reduce) the time required to obtain the resonant frequency (resonant point) drastically.

Figure 4:
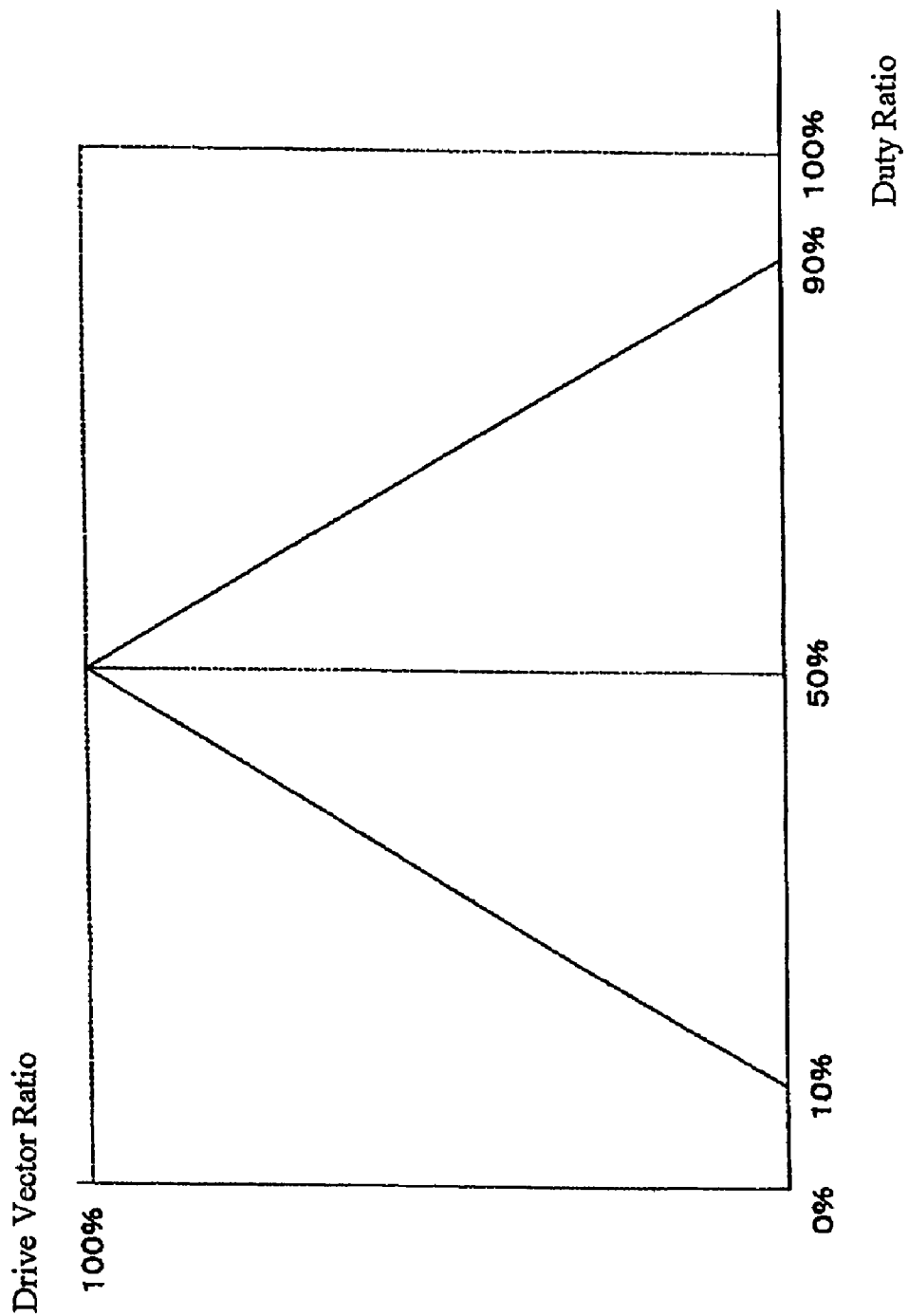
FIG. 4 is a graph schematically illustrating the relationship between a duty ratio and drive vector ratio of the drive signal.

Next, a description will be given for a piezoelectric response speed characteristic of a piezoelectric load. FIG. 4 is a graph schematically illustrating the relationship between a duty ratio and drive vector ratio of the drive signal. As shown in FIG. 4, the drive vector ratio of the piezoelectric load 3 becomes a maximum value (i.e., 100%) when the duty ratio is 50%, and becomes 0% when the duty ratio is 10% or 90%. In the range in which the duty ratio is from 10% to 50% or from 50% to 90%, the drive vector ratio moves (changes) substantially linearly. Thus, by carrying out the PWM control for the piezoelectric load 3 in such a range, it is possible to control the drive vector of the piezoelectric load 3 like an analogue manner, i.e., with a continuous quantity. Further, as seen in FIG. 4, the graph of the piezoelectric response speed characteristic is line symmetry against the line on which the duty ratio is 50% (for example, a voltage value when the duty ratio is 80% is substantially equal to a voltage value when the duty ratio is 20%).

Therefore, it is possible to expect that the piezoelectric load 3 be PWM-controlled using this characteristic. Namely, by using the duty ratio of the drive signal in the range of 10%-50% or 50%-90%, the drive output for the piezoelectric load 3 can be properly changed between 0% and 100%. This means that there is no need to control on/off of an actuator or the like (in this case, the piezoelectric load 3) according to the duty ratio of the drive signal as the PWM control for a conventional motor or the like. In the case where the piezoelectric element is used as a load, the process to obtain the resonant frequency (resonant point) of the load must be carried out again when the actuator or the like is turned on after it was turned off. However, since the resonance control apparatus 100 carries out the PWM control for the load using its piezoelectric response speed characteristic, it is possible to control the drive vector ratio while the frequency of the drive signal is maintained at the resonant frequency of the piezoelectric load 3. In this regard, the "drive vector ratio" means the rate of the drive vector corresponding to each duty ratio in the case where it is determined that the drive vector (output) when the duty ratio of the drive signal is 50% is 100%.

Figure 5:
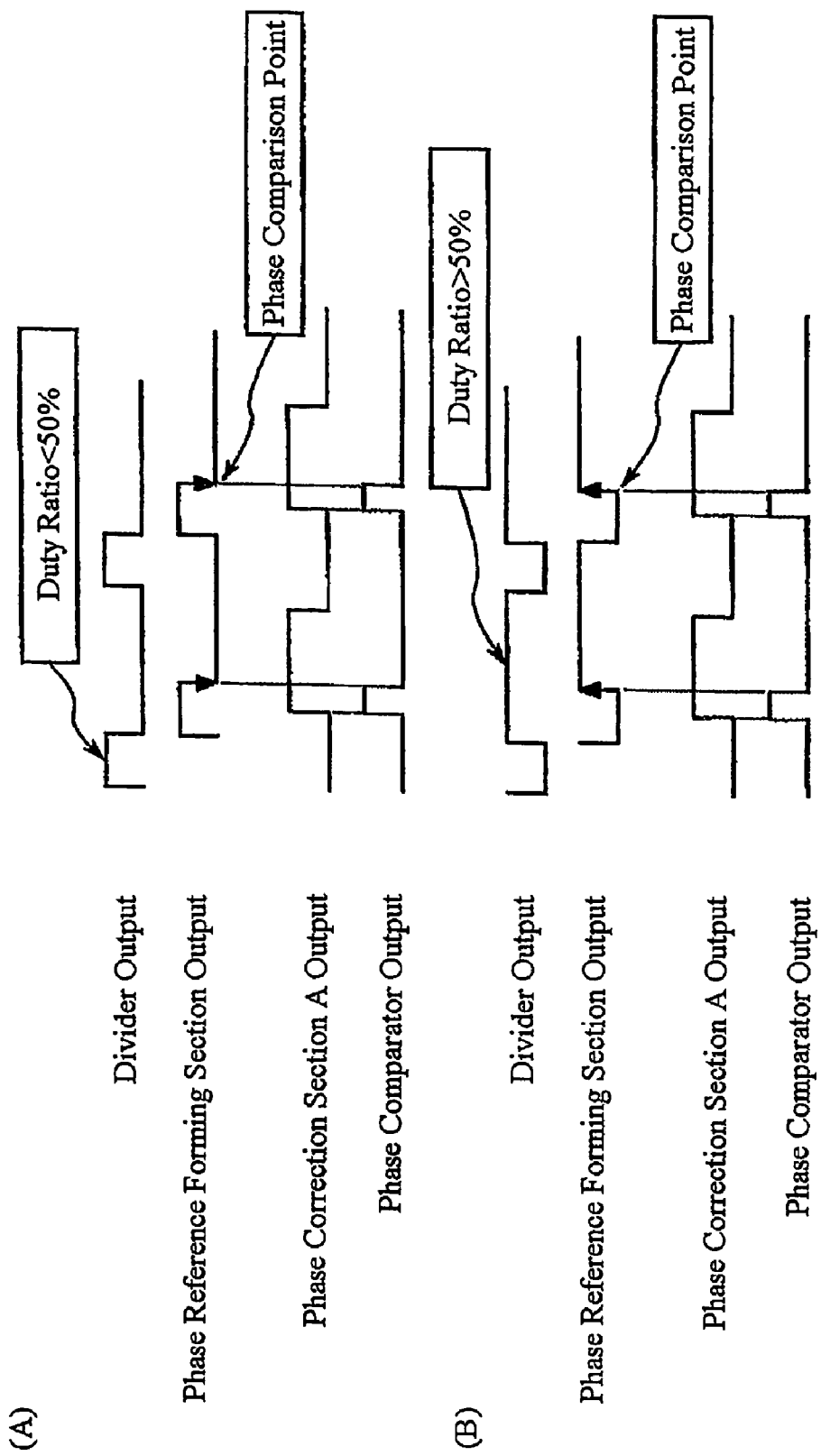
FIG. 5 is a diagram illustrating the relationship between the duty ratio controlled by the duty control section and the phase comparing position determined by the phase reference forming section.

Next, a description will be given for a phase comparison point characteristic in the duty control. FIG. 5 is a diagram illustrating the relationship between the duty ratio controlled by the duty control section 30 and the phase comparing position determined by the phase reference forming section 50. FIG. 5(A) shows the output signals from the divider 20, the phase reference forming section 50, the first phase correction section 51 and the phase comparator 60 in the case where the duty ratio of the drive signal is less than 50%, and FIG. 5(B) shows the output signals from those components in the case where the duty ratio of the drive signal is more than 50%.

As the phase comparison point shown in FIG. 5, the phase reference forming section 50 determines the trailing point of the output signal from the phase reference forming section 50 as a phase comparison point in the phase comparator 60 in the case where the duty ratio of the output signal is less than 50%. On the other hand, the phase reference forming section 50 determines the rising point of the output signal from the phase reference forming section 50 as a phase comparison point in the phase comparator 60 in the case where the duty ratio of the output signal is more than 50%. In this way, the phase reference forming section 50 changes the setting of the phase comparison point based on the duty ratio because the point where the duty ratio is 0% (duty ratio<50%) or 50% (duty ratio>50%) is phase-locked in the waveform of the voltage comparison signal, i.e., the waveform of the output signal from the first phase correction section 51 shown in FIGS. 5(A) and 5(B) (i.e., the third waveform from the top in FIG. 5), which is outputted from the voltage comparator 40 by comparing the detected signal outputted from the piezoelectric sensor 2 with the predetermined voltage value. In the case where the rising point of the waveform of the output signal from the phase reference forming section 50 is determined as the phase comparison point when the PWM control is carried out at the point in which the duty ratio is less than 50%, the control is not stabilized because the phase comparator 60 compares the phases using the point at which the waveform of the output signal varies according to the control of the duty control section 30 as a reference. The same is true in the case where the duty ratio is more than 50%. Therefore, the resonance control apparatus 100 is constructed so that the phase reference forming section 50 can set the phase comparison point in addition to delay the phase of the output signal from the divider 20 for a predetermined time.

Figure 6:
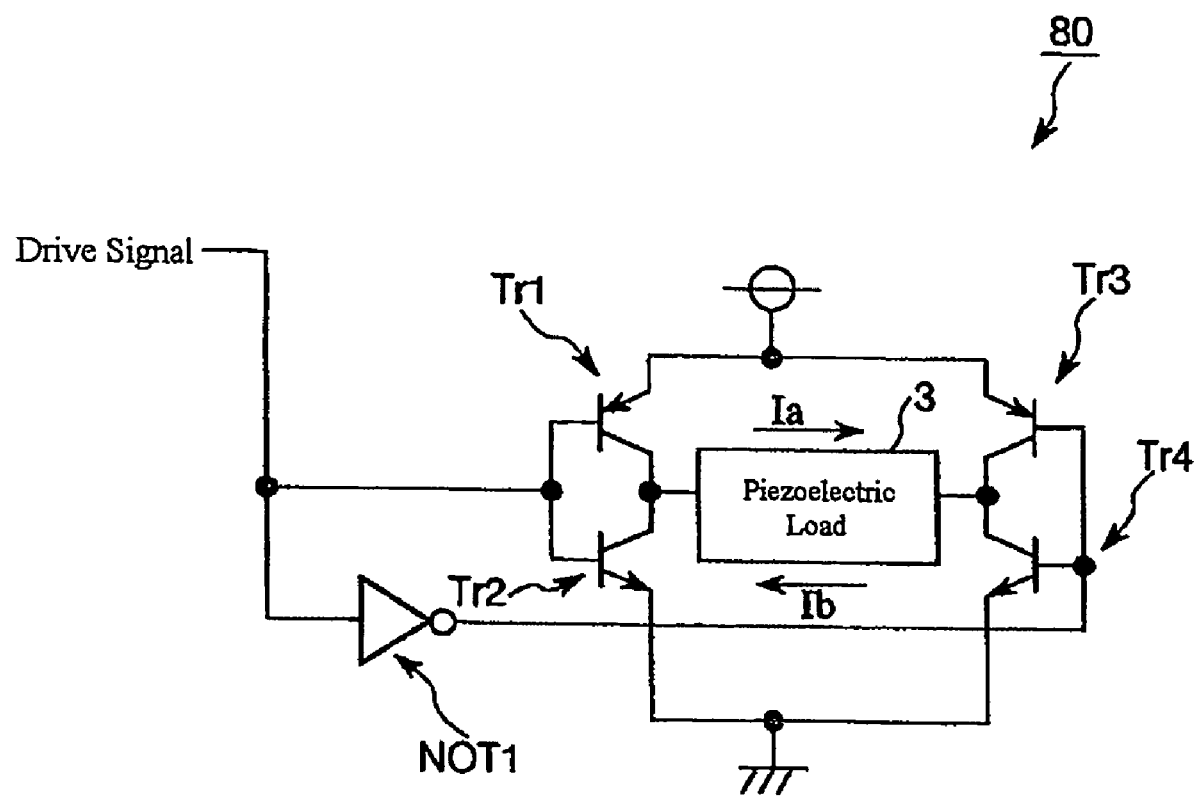
FIG. 6 is a diagram schematically illustrating an example of a circuitry of the driver shown in FIG. 1.

Next, a description will be given for the driver 80 to drive the piezoelectric load (piezoelectric element) 3. FIG. 6 is a diagram schematically illustrating an example of a circuitry of the driver 80 shown in FIG. 1. As shown in FIG. 6, the driver 80 includes four transistors Tr1, Tr2, Tr3 and Tr4, a voltage source, and a logical negation circuit NOT1.

When a square-wave whose duty ratio is controlled by the duty control section 30 is inputted to the driver 80 as a drive signal, during a high level of the drive signal, the transistors Tr2 and Tr3 are respectively turned on according to the high-level signal and the low-level signal that is inverted in the logical negation circuit NOT1, whereby the current Ib shown in FIG. 6 flows into the piezoelectric load 3 in the direction shown as an arrow Ib. On the other hand, during a low level of the drive signal, the two transistors Tr1 and Tr4 are turned on, whereby the current Ia shown in FIG. 6 flows into the piezoelectric load 3 in the direction shown as an arrow Ia. The resonance control apparatus 100 can supply the drive current similar to alternating current to the piezoelectric load 3 using the driver 80 constructed in this manner.

Figure 7:
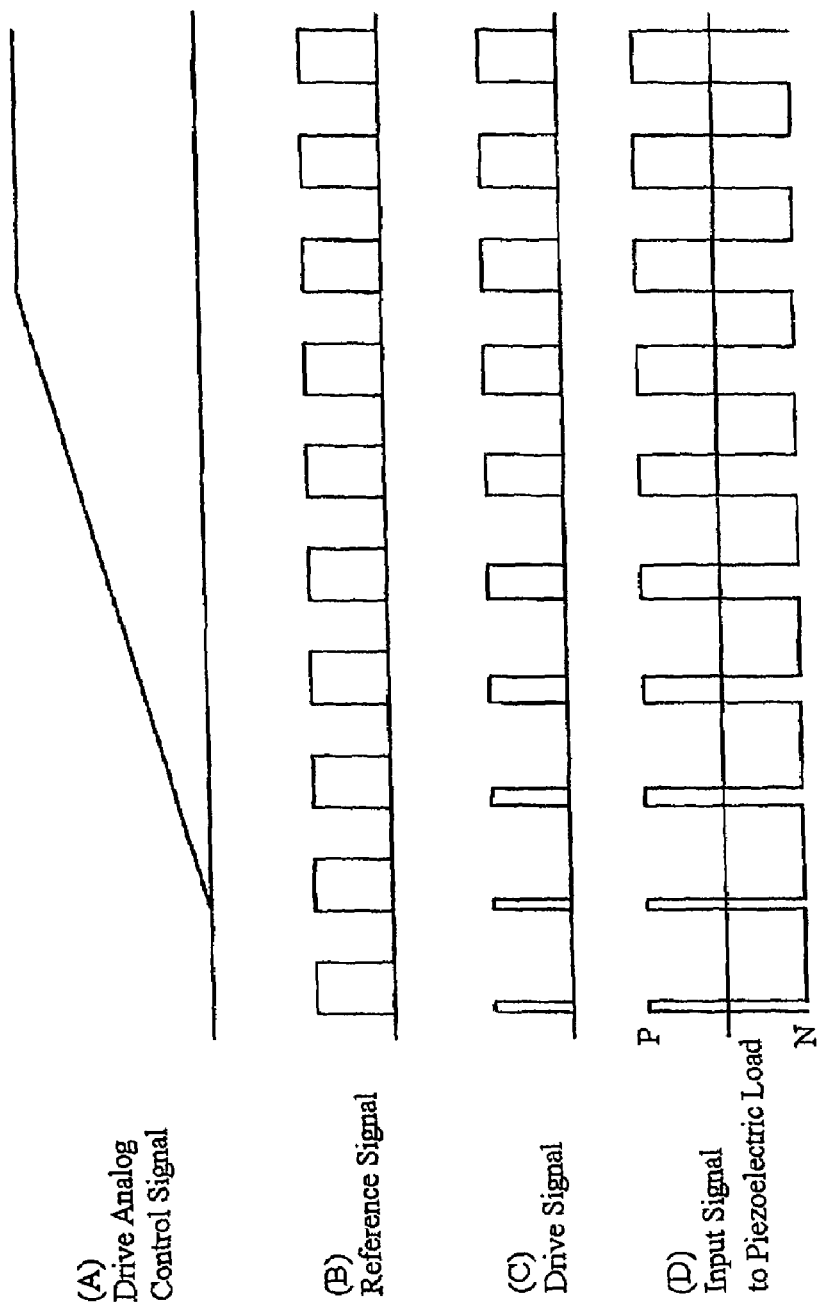
FIG. 7 is a diagram schematically illustrating waveforms of signals in the case where a drive analog control signal to be supplied to drive the piezoelectric load is one whose output is raised to a predetermined output level at a given rate.

Here, FIG. 7 is a diagram schematically illustrating waveforms of signals in the case where a drive analog control signal to be supplied to drive the piezoelectric load 3 is one whose output is raised to a predetermined output level (voltage value) at a given rate (given slope). When the signal having a predetermined frequency is outputted from the divider 20 as a reference signal (see FIG. 7(B)), the duty control section 30 sets the duty ratio of the drive signal inputted to the piezoelectric load 3 so as to response to the variation in the drive analog control signal shown in FIG. 7(A). Then, when the drive signal shown in FIG. 7(C) is inputted to the driver 80, an input signal having the waveform shown in FIG. 7(D) is supplied to the piezoelectric load 3.

In this regard, the case where the duty control section 30 sets the duty ratio in the range from 10% to 50% in the piezoelectric response speed characteristic of the piezoelectric load 3 shown in FIG. 4 is shown in FIG. 7. In this case, since the predetermined output level is set as the level at which the drive vector ratio of the piezoelectric load 3 is 100%, as shown in FIG. 7, the duty ratios of the drive signal and the input signal supplied to the piezoelectric load 3 becomes 50% when the output level (voltage value) of the drive analog control signal is restored to the predetermined value.

Next, a description will be given for another embodiment of the resonance control apparatus 100 of the present invention. In the present embodiment, the application of the resonance control apparatus 100 to normal and reverse drive control for the piezoelectric load 3 or double normal drive control for the piezoelectric load 3 is shown. FIGS. 8(A) and 8(B) are diagrams illustrating examples of the structures in which two vibrating elements 81, 81, or 81, 82 each including a piezoelectric load 3 that is controlled by the resonance control apparatus 100 according to the present invention rotate a rotor 300. FIG. 8(A) shows the case where the rotor 300 is rotated by means of a normal drive vibrating element 81 and a reverse drive vibrating element 82, and FIG. 8(B) shows the case where the rotor 300 is rotated by means of two normal drive vibrating elements 81, 81.

In this way, in the structure shown in FIG. 8(A), since the normal drive and reverse drive vibrating elements 81, 82 are applied to the one rotor 300, the rotor 300 can be controlled so as to rotate in both rotative directions. Further, in the structure shown in FIG. 8(B), since the two normal drive vibrating elements 81, 81 are applied to the one rotor 300, the setting of the drive force for rotating the rotor 300 can be changed in the range from 0% to 200% theoretically.

In this regard, the number of the vibrating elements 81 and/or 82 applied to the one rotor 300 is not limited to two shown in FIG. 8, but the present invention may apply one or a plurality of vibrating elements 81 and/or 82 to the one rotor 300. Further, in the structure shown in FIG. 8(A), it is preferred that the normal drive vibrating element 81 and the reverse drive vibrating element 82 are respectively controlled by two duty control sections 30, 30 (see FIG. 9), and in the structure shown in FIG. 8(B), the two normal drive vibrating elements 81, 81 may be respectively controlled by the two duty control sections 30, 30, or may be controlled in cooperation with one duty control section 30.

Figure 9:
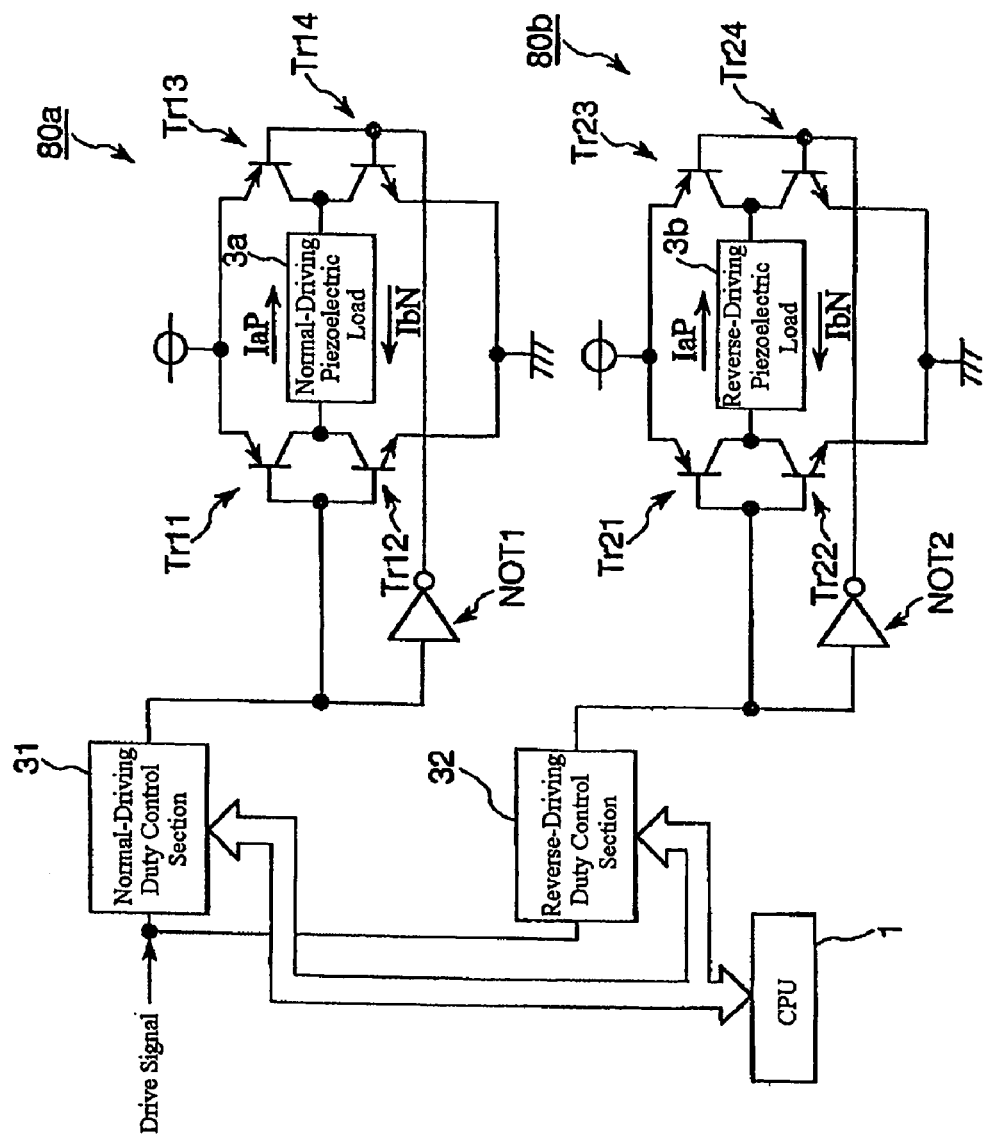
FIG. 9 is a diagram illustrating the partial structure of the resonance control apparatus according to the present invention in the case of using the two vibrating elements shown in FIG. 8(A).
Figure 10:
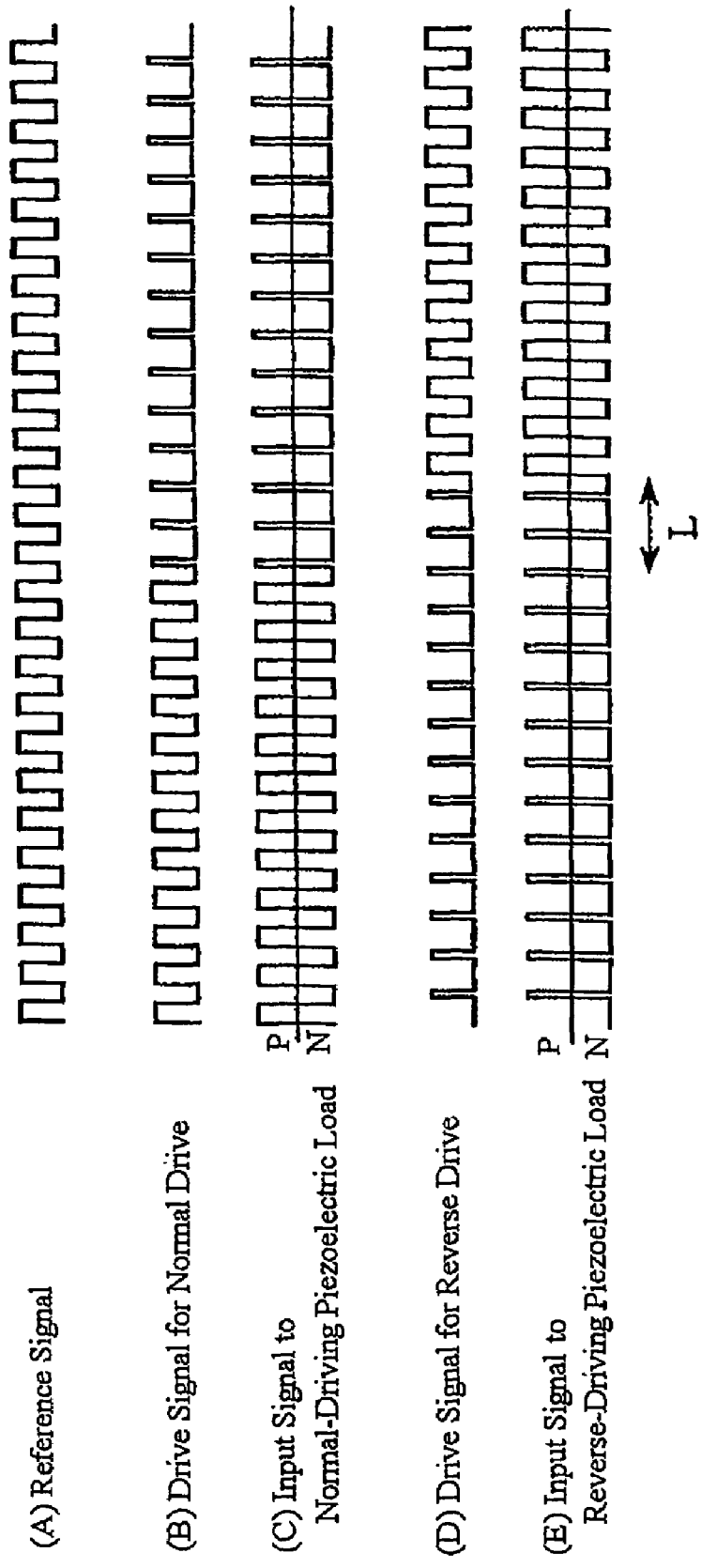
FIG. 10 is a diagram illustrating waveforms of the signals for normal drive and reverse drive respectively controlled by normal-driving and reverse-driving duty control sections in response to a reference signal.
Figure 11:
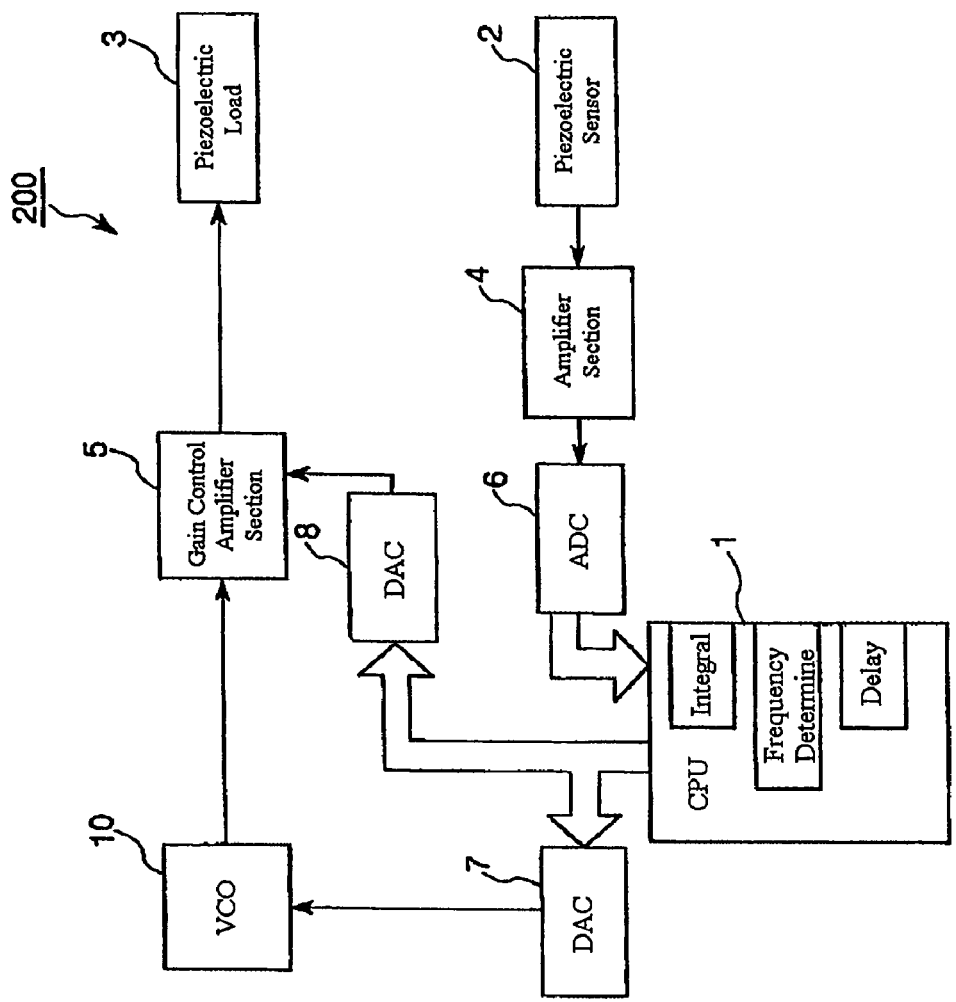
FIG. 11 is a block diagram schematically illustrating a main portion of a conventional resonance control apparatus.

A structure of a driver using the normal drive and reverse drive vibrating elements 81, 82 shown in FIG. 8(A), i.e., a piezoelectric load 3 for normal drive and a piezoelectric load 3 for reverse drive is illustrated in FIG. 9, and waveforms of drive signals for driving the drivers 80*a*, 80*b* are illustrated in FIG. 10. FIG. 9 is a diagram illustrating the partial structure of the resonance control apparatus 100 according to the present invention in the case of respectively controlling the normal drive and reverse drive of the piezoelectric loads 3*a*, 3*b* in the two vibrating elements 81, 82 shown in FIG. 8(A).

As shown in FIG. 9, a resonance control apparatus 100 for controlling the drives of a normal-driving piezoelectric load 3*a* and a reverse-driving piezoelectric load 3*b* includes a normal-driving duty control section 31 and a reverse-driving duty control section 32 in place of the duty control section 30 shown in FIG. 1. Further, the resonance control apparatus 100 includes a normal-driving driver 80*a* and a reverse-driving driver 80*b* in place of the driver 80. The CPU 1 controls each of the normal-driving duty control section 31 and the reverse-driving duty control section 32. Thus, based on the reference signal outputted from the divider 20, the normal-driving duty control section 31 sets the duty ratio of a signal for normal drive to drive the normal-driving piezoelectric load 3*a*, while the reverse-driving duty control section 32 sets the duty ratio of a signal for reverse drive to drive the reverse-driving piezoelectric load 3*b*.

In this regard, a normal-driving piezoelectric sensor (not shown in the drawings), which moves in synchronization with the normal-driving piezoelectric load 3*a*, is arranged close against the normal-driving piezoelectric load 3*a*, while a reverse-driving piezoelectric sensor (not shown in the drawings), which moves in synchronization with the reverse-driving piezoelectric load 3*b*, is arranged close against the reverse-driving piezoelectric load 3*b*. By carrying out the processing of the detected signals (output signals) of these piezoelectric sensors as mentioned above, it is possible to control the drives of the normal-driving piezoelectric load 3*a* and the reverse-driving piezoelectric load 3*b* independently.

FIG. 10 is a diagram illustrating waveforms of the signals for normal drive and reverse drive respectively controlled by normal-driving and reverse-driving duty control sections 31, 32 in response to a reference signal. Based on the reference signal (see FIG. 10(A)) outputted from the divider 20 in the resonance control apparatus 100, the signal for normal drive (see FIG. 10(B)) and the signal for reverse drive (see FIG. 10(D)) respectively controlled by normal-driving and reverse-driving duty control sections 31, 32 are inputted to the normal-driving driver 80*a* and the reverse-driving driver 80*b*. Thus, the drive signal shown in FIG. 10(C) is inputted to the normal-driving piezoelectric load 3*a*, while the drive signal shown in FIG. 10(E) is inputted to the reverse-driving piezoelectric load 3*b*.

In this way, the resonance control apparatus 100 of the present embodiment can control the normal drive and reverse drive of the two piezoelectric loads 3*a*, 3*b* shown in FIGS. 8(A) and 9. When the two vibrating elements 81, 82 are controlled in response to the drive signals shown in FIG. 10, first, the normal drive vibrating element 81 is driven with the output of 100%, whereby the rotor 300 is rotated in the direction X shown in FIG. 8(A). Subsequently, the outputs of the normal drive and reverse drive vibrating elements 81, 82 becomes 0% during the period L shown in FIG. 10(E), thereby stopping the rotor 300. Next, as shown in FIG. 10(E), the reverse drive vibrating element 82 is driven with the output of 100%, whereby the rotor 300 is rotated in the direction Y shown in FIG. 8(A). In this case, as in the case shown in FIG. 7, the duty ratio in the range of 10%-50% is utilized in the input signals to the piezoelectric load 3*a*, 3*b* shown in FIG. 10. However, as mentioned above, the resonance control apparatus 100 can achieve the same drive (operation) in the case where the drive signal is generated using the duty ratio in the range of 50%-90%.

As described above, in the resonance control apparatus 100 of the preferred embodiments according to the present invention, the reference signal outputted from the VCO 10 (i.e., reference signal generating section) is divided in the divider 20, the phase of the divided signal having the predetermined frequency is delayed by the phase reference forming section 50, the detected signal outputted from the piezoelectric sensor 2 is compared with the predetermined voltage value by the voltage comparator 40, the phase of the output signal from the voltage comparator 40 (i.e., voltage comparison signal) is delayed by the first phase correction section 51 as required, the phases of the phase-delayed signals are compared by the phase comparator 60, and the output signal from the phase comparator 60 (i.e., phase comparison signal) is fed back to the VCO 10 after its high-frequency component is cut off by the LPF 70.

In the resonance control apparatus 100 and the method of controlling the resonant device of the present invention, by voltage-comparing a predetermined voltage value with the waveform of the detected signal obtained by detecting the driving state of the piezoelectric load 3 to be controlled using the piezoelectric sensor 2, the frequency of the drive signal is rapidly heightened to the resonant frequency region of the piezoelectric load 3. Then, the resulting signal is fed back to the VCO 10 to obtain the resonant point (resonant frequency) of the piezoelectric load 3, thereby controlling the driving of the piezoelectric load 3 at the resonant point.

Therefore, according to the resonance control apparatus 100 and the method of controlling the resonant device of the present invention, it is possible to shorten (reduce) the time required to obtain the resonant frequency in the case where a rapid drive such as posture control is implemented, and thus, it is possible to control the rest or movement of an object in the posture control quickly. Therefore, this makes it possible to control the driving of the piezoelectric load 3.

Further, since the resonance control apparatus 100 of the present invention generates a square-wave (voltage comparison signal) by comparing the detected signal (analog signal) from the piezoelectric sensor 2 with a predetermined voltage value, the control after obtaining the voltage comparison signal can be digitized. Thus, since the digitized control sections (components) are increased in the entire apparatus, it is possible to integrate such control sections into an IC chip. Moreover, since it is possible to control the driving of the piezoelectric load 3 without carrying out the processing such as integral operation, frequency determining operation, and the like by means of the CPU 1, it is possible to downsize the circuitry of the resonance control apparatus 100.

Note that, in the embodiments, the drive control of the piezoelectric load 3 when the duty ratio of the drive signal is in the range of 10%-50% has been described, but the present invention is not limited to this range. As described above, in the present invention, the drive signal whose duty ratio is in the range of 50%-90% may be utilized.

As described above, it should be noted that, even though the resonance control apparatus and the method of controlling a resonant device according to the present invention have been described with reference to the preferred embodiments shown in the accompanying drawings, the present invention is not limited to these embodiments, it is of course possible to make various changes and modifications to each element of resonance control apparatus, and various elements described above can be replaced with any other element capable of performing the same or a similar function.

The invention claimed is:

1. A resonance control apparatus that drives a resonant device having a resonance characteristic, the resonant device functioning as a resonant sensor, the apparatus comprising:
   a reference signal generating section that generates a reference signal having a predetermined frequency in response to a voltage signal that is inputted into the reference signal generating section;
   a divider that divides the predetermined frequency of the reference signal generated by the reference signal generating section to output a signal having a given frequency;
   a phase reference forming section that delays a phase of the signal outputted from the divider for a predetermined interval;
   a voltage comparator that compares a voltage of the output signal from the resonant sensor with a predetermined voltage, the resonant sensor detecting the driving state of the resonant device in synchronization with the driving of the resonant device;
   a phase comparator that compares the phase of the signal outputted from the voltage comparator with the phase of the signal outputted from the phase reference forming section, and
   a duty control section that controls a duty ratio of the drive signal provided for the resonant device based on the reference signal outputted from the reference signal generating section, the duty control section being constructed to control the duty ratio of the drive signal substantially linearly in the range of either 10%-50% or 50%-90%.

2. The apparatus as claimed in claim 1, further comprising a low-pass filter that cuts out a high frequency component of the output signal from the phase comparator wherein the output signal from the low-pass filter constitutes the voltage signal inputted into the reference signal generating section.

3. The apparatus as claimed in claim 1, wherein the phase reference forming section is constructed so as to be capable of selecting either a rising edge or trailing edge of the signal delayed in the phase reference forming section when the phase comparator compares the phases, based on the duty ratio of the drive signal controlled by the duty control section.

4. The apparatus as claimed in claim 1, wherein the output signal from the resonant device corresponds to a resonant frequency of the resonant device, and the frequency of the drive signal outputted from the duty control section is controlled so as to be equal to the resonant frequency.

5. The apparatus as claimed in claim 4, wherein the apparatus carries out the PWM control for the resonant device based on the duty ratio of the drive signal controlled by the duty control section.

6. The apparatus as claimed in claim 5, wherein the PWM control is carried out so as to maintain the resonant frequency of the resonant device.

7. The apparatus as claimed in claim 1, further comprising a first phase correction section arranged between the voltage comparator and the phase comparator, the first phase correction section correcting the phase of the signal outputted from the voltage comparator to output the phase-corrected signal to the phase comparator.

8. The apparatus as claimed in claim 7, further comprising a second phase correction section that corrects the phase of the output signal from the duty control section in response to the phase of the resonant frequency of the resonant device.

9. The apparatus as claimed in claim 1, further comprising a second duty control section having a function same as the duty control section, the second duty control section being arranged in parallel with the duty control section;
   wherein the two duty control sections are respectively provided for normal drive and reverse drive of the resonant devices, and can control the duty ratios of the drive signals for normal drive and reverse drive either independently or jointly.

10. The apparatus as claimed in claim 1, further comprising at least one duty control section having a function same as the duty control section arranged in parallel with the duty control section;
    wherein at least two duty control sections among the duty control section and the at least one duty control section are provided for normal drive of the resonant devices, and can control the duty ratio of the drive signals for normal drive either independently or jointly.

11. A method of controlling a resonant device having a resonance characteristic, the resonant device functioning as a resonant sensor, the method comprising the steps of:
    generating a reference signal having a predetermined frequency in response to a voltage signal to be inputted, the reference signal being a drive signal for the resonant device;
    dividing the predetermined frequency of the reference signal to output a signal having a given frequency;
    delaying a phase of the output signal for a predetermined interval;
    comparing a voltage of the output signal from the resonant sensor with a predetermined voltage to output a voltage comparison signal, the resonant sensor detecting the driving state of the resonant device in synchronization with the driving of the resonant device;
    comparing the phase of the voltage comparison signal with the phase of the delayed signal to output a phase comparison signal, the phase comparison signal corresponding to the voltage signal to be inputted;
    controlling a duty ratio of the drive signal supplied to the resonant device substantially linearly in the range of either 10%-50% or 50%-90%; and
    carrying out the PWM control of the resonant device using the duty ratio of the drive signal.

12. The method as claimed in claim 11, wherein the duty ratio controlling step includes respectively controlling duty ratios of two types of drive signals supplied to two resonant devices, which are provided for normal drive and reverse drive of the two resonant devices, based on the reference signal, and the PWM control carrying out step includes carrying out the PWM control for the two resonant devices using the duty ratios of the drive signals.

13. The method as claimed in claim 11, wherein the duty ratio controlling step includes respectively controlling duty ratios of at least two drive signals for normal drive supplied to at least two resonant devices based on the reference signal either independently or jointly, and the PWM control carrying out step includes carrying out the PWM control for the at least two resonant devices using the duty ratios of the at least two drive signals.

* * * * *